UNITED STATES PATENT OFFICE.

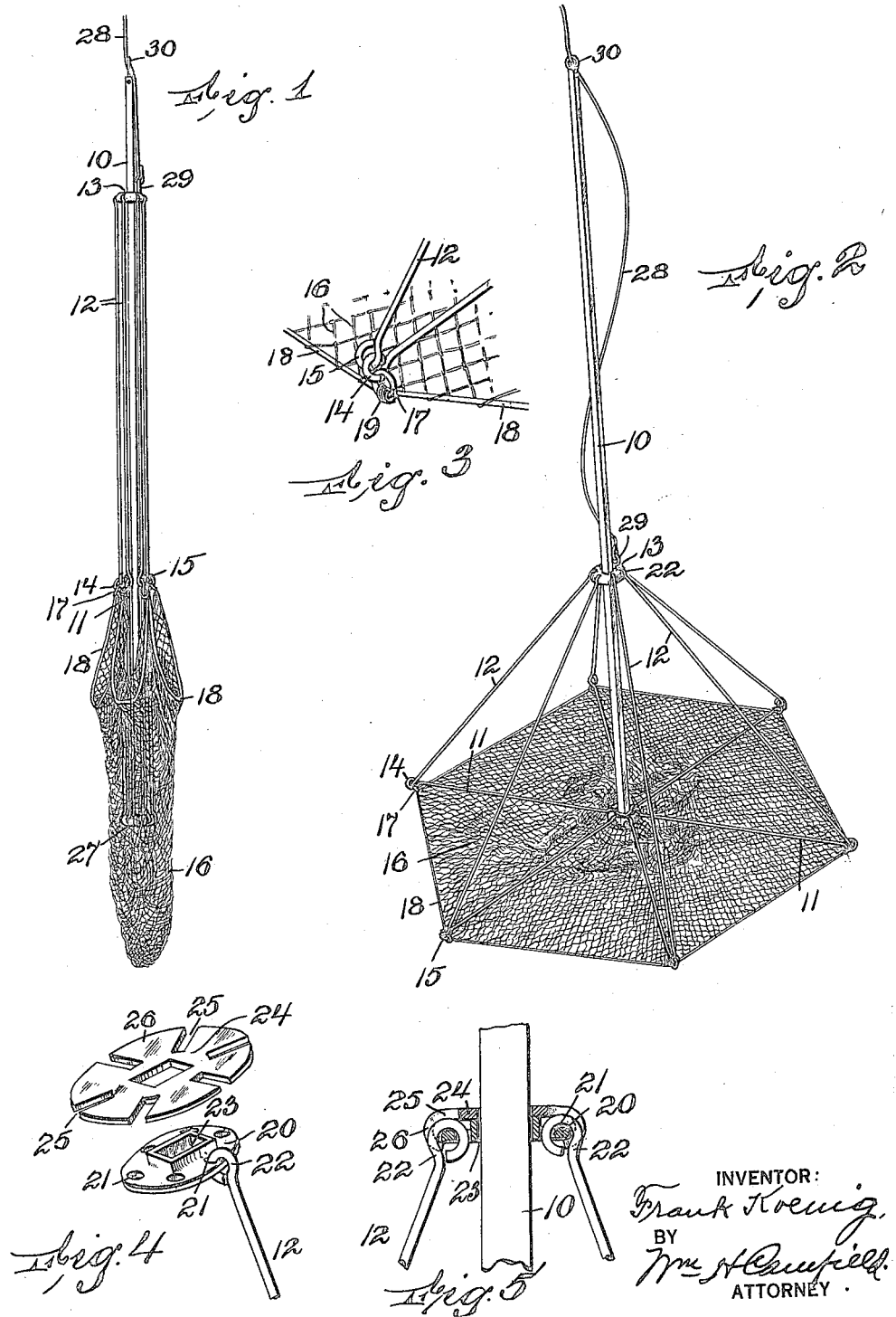

FRANK KOENIG, OF WEST KEANSBURG, NEW JERSEY.

CRAB TRAP.

1,403,171.  Specification of Letters Patent.  Patented Jan. 10, 1922.

Application filed July 13, 1921. Serial No. 484,322.

*To all whom it may concern:*

Be it known that I, FRANK KOENIG, a citizen of the United States, and a resident of West Keansburg, county of Monmouth, and State of New Jersey, have invented certain new and useful Improvements in Crab Traps, of which the following is a specification.

This invention relates to an improved crab trap which is adapted to be extended when lowered into the water to the bottom, and to be folded to form a pocket when it is raised, this folding to a pocket-like form being automatic when the strand by means of which the device is raised and lowered is used in suspending the device, and when so folded the trap forms a long narrow article which can be easily placed in a cover and occupies less room than the average fishing rod, and is thus well adapted for transportation or storage on trips.

The invention further consists in certain details of construction which will be hereinafter more fully described and finally embodied in the claims.

The invention is illustrated in the accompanying drawing, in which Figure 1 is a side view of the trap folded. Figure 2 is a perspective view of the device when extended. Figure 3 is a detail perspective of a joint of a rib and stretcher of the device. Figure 4 is a perspective view showing parts of the runner separated, and Figure 5 is a detail section showing the parts of the runner assembled and illustrating the manner in which the inner ends of the ribs are hinged to the runner.

The device comprises a central rigid stem 10, which, in the form shown, is made of square tubing, and on the lower end is a collapsible or folding part which holds the bait and which, when folded, confines the crabs. The folding part consists of ribs 11 and stretchers 12, the ribs 11 being hinged at their inner ends to the bottom end of the stem, the stretchers 12 being hinged at their outer ends to the ribs and at their inner ends to a runner 13 which is slidable on the stem 10.

In order that the device may extend itself when it rests on the bottom of the body of water in which it is used, the hinged joints are freely fitted so that they swing readily, one form of such hinging being shown in Figure 3, each rib having at its end an eye 14 into which is loosely fitted the eye 15 at the end of the stretcher 12.

A net 16 is fastened to the ribs, usually at their outer ends, and one convenient form of doing this is by providing a ring 17 in each eye 14 of a rib and fastening the marginal or top strand 18 of the net 16 to each ring, such as by the windings or stitchings 19. The runner 13 in the form shown comprises a washer 20 having perforations 21 into which the eyes 22 at the inner ends of the stretchers 12 are looped. The washer has an opening 23 which fits loosely around the stem 10 so that it can easily slide thereon, and a plate 24 is slitted, as at 25, to receive each of the eyes 22, the spaces between the slits 25 forming wings 26 which are bent down, as shown in Figure 5, to embrace the bottom of the washer 20 at the edge, thus holding the ribs against undue twisting, that is, holding them in alignment with their swinging plane so that they do not become tangled, but still permitting a free motion so that they do not become bound.

The medium for securing the inner ends of the ribs 11 to the stem can be of various forms, but I show at 27 a device similar to that just described, and which is illustrated in Figures 4 and 5, which is placed upside down on the end of the stem and held in position by a pin or other means against movement along the stem.

The net 16 is usually made so that when it is folded it forms a pocket of material length, so that it is not of small capacity and securely confines crabs and the like against escape when the device is being raised.

The folding of the trap and the suspending of it are usually accomplished by a single means which is adapted to raise the ribs so as to fold the bottom part of the trap, and when this folding has been accomplished such means acts to suspend the device, these actions, of course, being reversed when the trap is being set, in that when the suspending terminates by reason of the trap resting on the bottom, a further manipulation of said means permits the extending or expansion of the trap to the position where it can receive the crabs.

In the form shown this means comprises a strand, such as a line 28, which is secured at its lower end preferably to the runner 13, as by means of the staple 29 which is riveted or otherwise secured to the runner, the line being freely slidable at the upper part of the stem, as through the eye 30, as will be clearly seen from Figures 1 and 2.

When the device is to be lowered it is in the position shown in Figure 1 and the bait is put inside the net 16, which is now folded to form a pocket-like article, and when it has been lowered and the bottom end of the stem rests on the bottom of the body of water, the line 28 is allowed to become slack. The weight of the ribs, which are usually made of stiff wire, and of the stretchers, which are of the same material, and the weight of the runner 13 cause the device to extend and the ribs 11 to swing outward and downward until they rest on the bottom, as shown in Figure 2, the bait being in the center and secured against easy dislodgement by reason of the end of the stem resting on it.

When the trap is to be raised, all that it is necessary to do is to pull on the line 28, which pulls up the runner 13, at the same time holding the stem vertical because the line passes through the eye 30 at the top. The runner 13 continues to slide up along the stem 10 until it is in the position shown in Figure 1, and then the line acts as a suspending means for the whole device and the trap and its contents are lifted to the surface.

It will be noted that this device can be easily adapted for use with an ordinary crab net, and it will be evident that changes in the details of construction and in the relative sizes and proportions of the parts may be resorted to without departing from the scope of the invention.

The ribs 11 can be utilized for tying the bait thereto if it is desired to have separated pieces of meat and the like distributed over the surface of the open trap, the bait and the crabs being all confined within the pocket-like net when the device is folded up.

I claim:

1. A crab trap comprising a central rigid stem, ribs hinged to the stem, stretchers hinged to the ribs, a runner on the stem, the stretchers being hinged to the runner, a strand secured so as to raise the runner and freely slidable in the top of the stem so as to raise the whole device when the runner reaches its upward limit of movement, and a net secured so as to be flattened when the ribs are extended and to be gathered to form a pocket when the ribs are folded.

2. A crab trap comprising a stem, a set of radially swingable ribs secured to the bottom of the stem, a runner on the stem, stretchers pivoted to the runner and to the outer ends of the ribs, a net secured at its top edge to the ends of the ribs and formed so as to extend a material distance below the stem when the ribs are folded, an eye on the stem, and a strand passing through the eye and secured to the runner.

In testimony that I claim the foregoing, I have hereto set my hand, this 12th day of July, 1921.

FRANK KOENIG.